INVENTORS.
George Dickson
BY Warren H. Zuercher

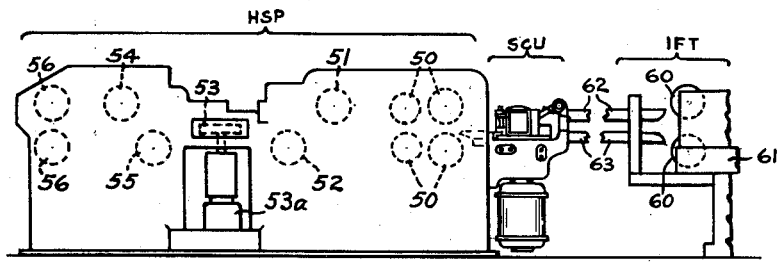
Fig. 1
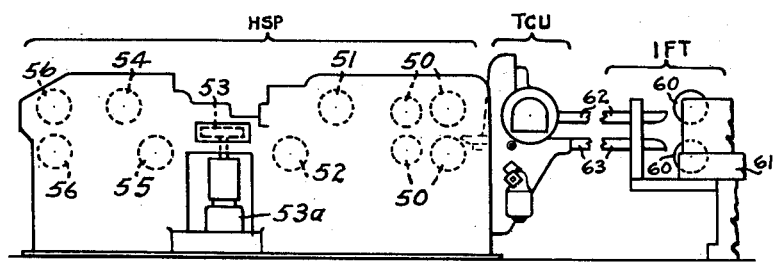
Fig. 2
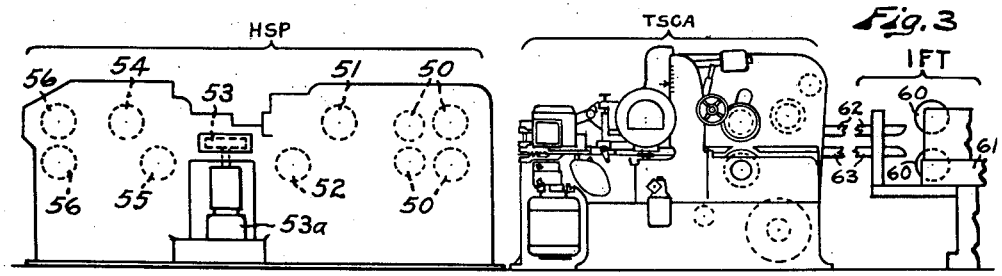
Fig. 3
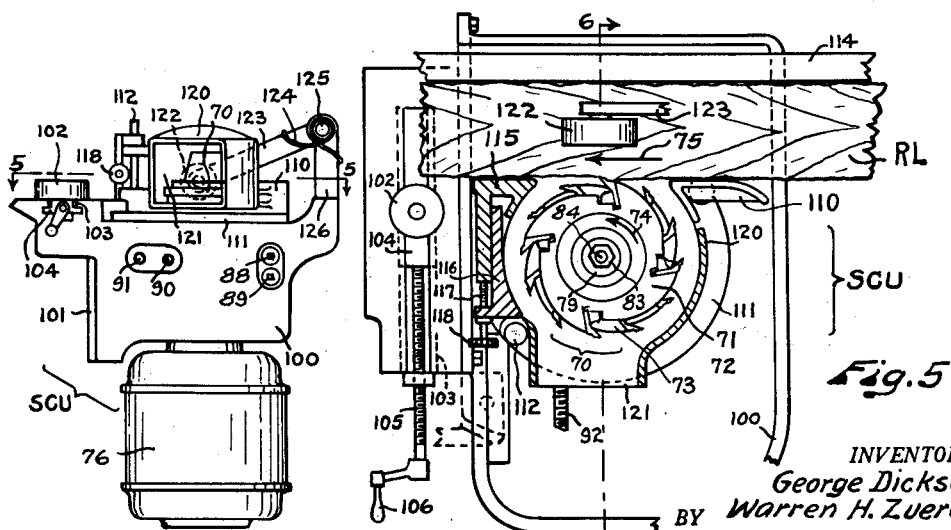
Fig. 4
Fig. 5
INVENTORS.
George Dickson
Warren H. Zuercher
BY Arnold and Grambal
ATTORNEYS.

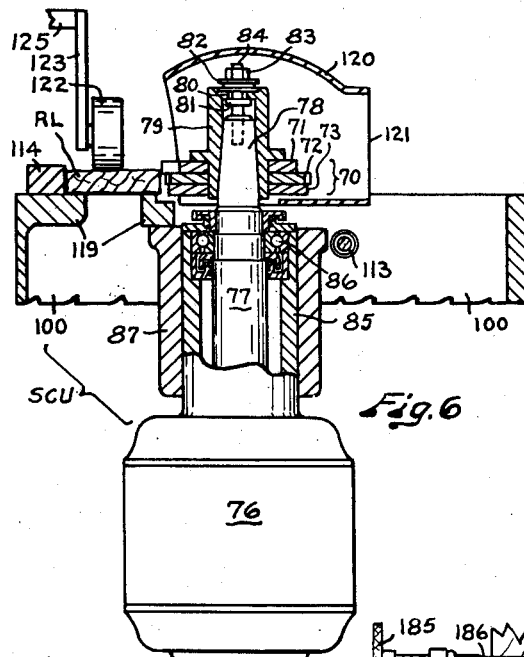
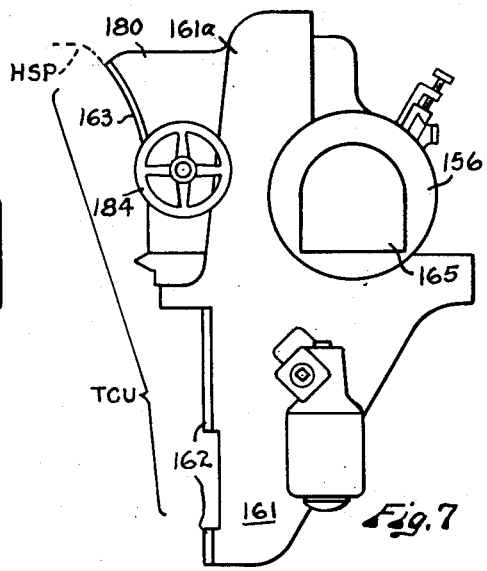
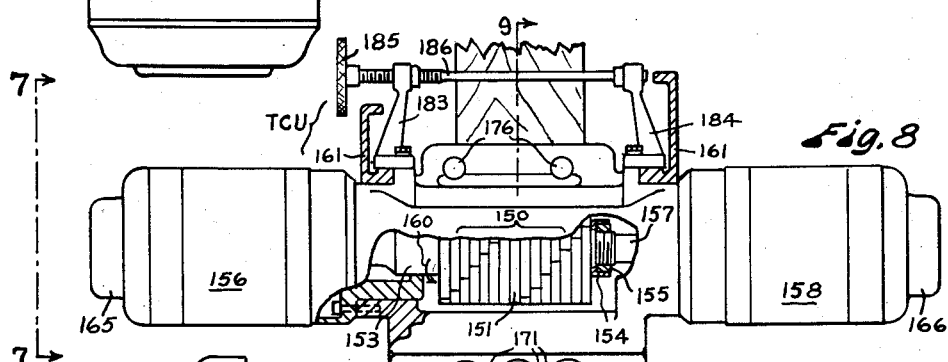
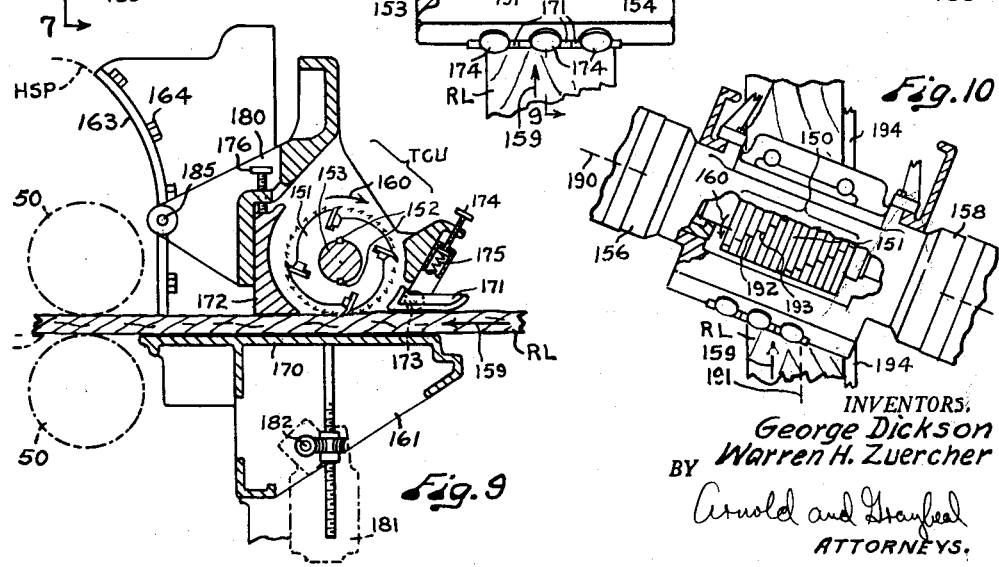

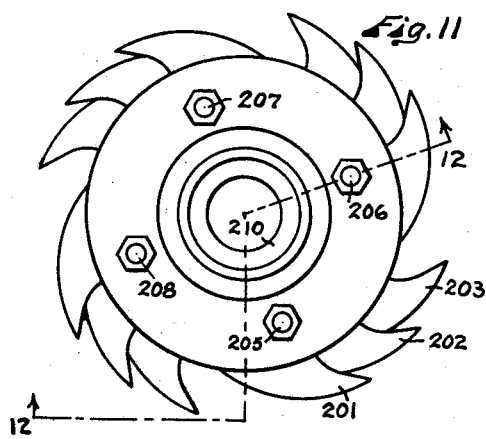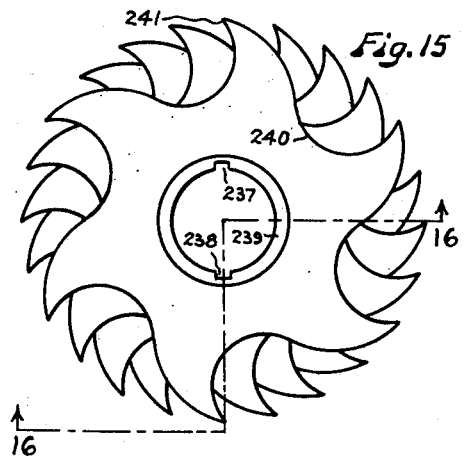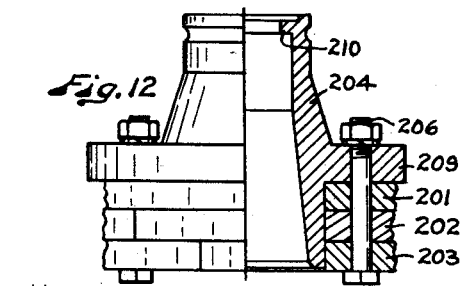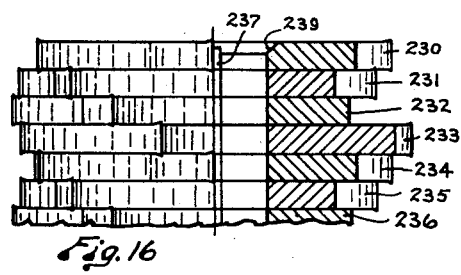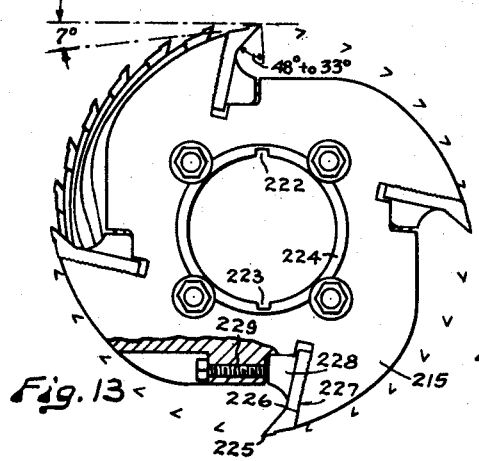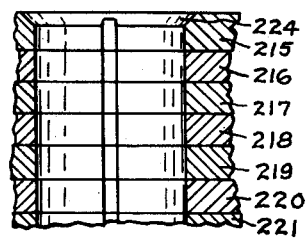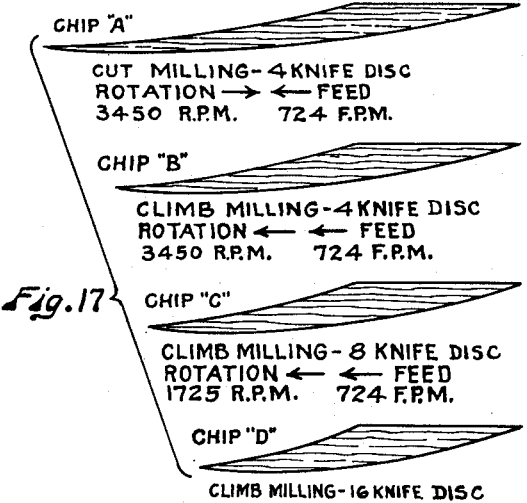

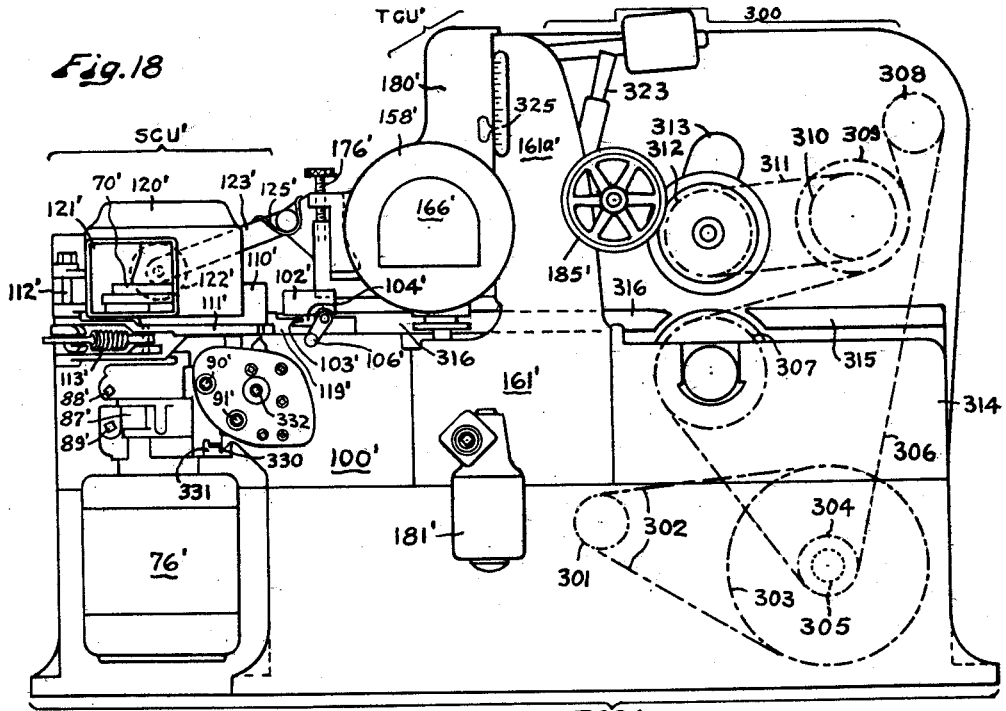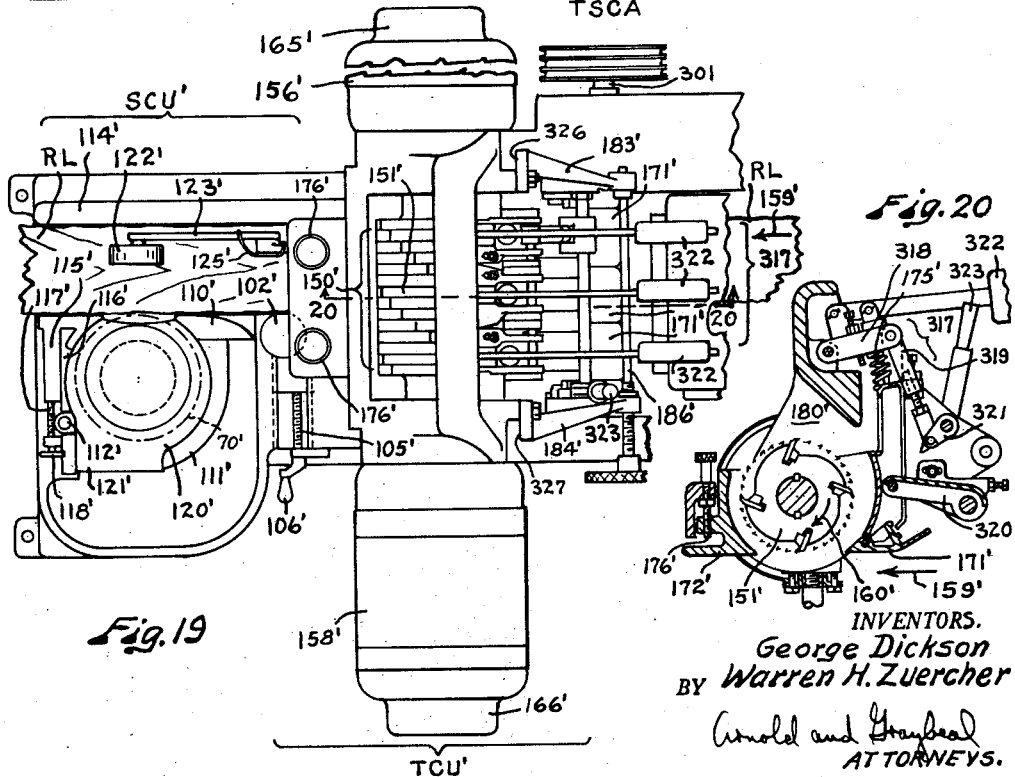

Arnold and Graybeal
ATTORNEYS.

United States Patent Office 3,082,802
Patented Mar. 26, 1963

3,082,802
METHOD OF AND APPARATUS FOR FORMING PULPING CHIPS INCIDENT TO LUMBER FINISHING
George Dickson and Warren H. Zuercher, both of 3200 1st Ave. S., Seattle, Wash.
Filed Mar. 13, 1958, Ser. No. 721,315
16 Claims. (Cl. 144—326)

The present invention relates to methods of and apparatus for forming chips. More particularly, the present invention relates to novel methods, equipments and control systems for forming pulping chips of a highly uniform character, incident to finishing or blanking of rough lumber stock, the chips being formed from the excess thickness and/or width dimension of the lumber stock, i.e. from only that part of the unfinished lumber which is normally discarded as shavings.

In the art of processing wood chips to form wood pulp by bisulfite extraction processes and the like, it is necessary to have wood chips which are relatively large and relatively uniform in length along the grain, in order that the pulping reaction can be reasonably efficient and controlled within practical limits. It has been found that sawdust and conventional shavings are unsatisfactory as raw materials for wood pulping processes because of the nonuniformity of width and length of the wood particles, resulting in haphazard digestion and resulting in inefficient utilization of the pulping reactants. It has accordingly become conventional practice to form pulping chips by "chippers" which consume the entire wood stock and which are, therefore, limited to scrap lumber as a source material for the pulping chips.

There has been a long standing need in the lumber finishing industry for some means by which the very substantial wastage represented by shavings from finishing machines such as high speed planers can be recovered in a form suitable for pulp digestion. In use of high speed planning equipment to finished lumber units, a considerable amount of the lumber becomes waste because the shavings from the finishing heads are quite irregular in length and thickness and are not adaptable to uniform pulp digestion.

Another problem encountered in the lumber finishing art is occasioned by the fact that rough cut lumber as a matter of practice varies considerably as to transverse dimensions and nature of the grain and it is often necessary to run a conventional planer considerably slower (i.e. to slow the lumber feed speed) when the dimension to be removed by the finishing blades is relatively thick. Attempts have been made to rectify this problem by use of "pre-hoggers," such as by use of the system disclosed in Nicholson et al. Patent No. 2,276,240, but such pre-hoggers are in effect a pre-planing stage and cut mill the lumber (i.e. rotate in a direction against the direction of feed of the lumber), and operate at a high speed corresponding to the rate of cut of conventional planer heads. Such pre-hoggers thus produce the removed wood in the form of sawdust or shavings, which, as indicated, is a form not suitable for pulping chip use.

It is a primary object and advantage of the present invention to provide apparatus, and a method of operation thereof, by means of which the excess thickness and/or width dimension of uncut lumber is removed incident to finishing of the lumber, as chips satisfactory for pulp digestion, with remarkable uniformity as to chip size, and without deleterious tear-out of the lumber stock surfaces.

"Tear-out," as known to the art, is the splitting of the lumber being machined along the grain into the finished dimension thereof, usually accompanied by removal of some of the wood to the point of defacing the finished lumber surface. Tear-out is basically caused by chips or shavings being removed by cutter knives pulling away more or less additional wood. The degree of tear-out encountered under a given set of conditions is determined by the quality (evenness and direction of the grain) of the lumber stock, by the condition of the lumber stock (dry stock exhibits a greater tendency to tear-out than wet stock), and by the sharpness, angle, and direction and depth of cut of the cutting knives. When forming large chips in the process of blanking of rough lumber prior to finishing thereof, it has been found that cut milling techniques are not satisfactory because cut milling tends to separate the grain of the lumber being cut and results in an intolerable amount of tear-out when relatively large chips are formed. Moving the cutter knives to cut across the grain of the wood encounters the same difficulty. If tear-out is excessive, then the resulting depressions in the blanked lumber extend so deeply into the lumber that the subsequent finishing operation does not remove them and the quality of the finished lumber is adversely affected. Thus, only a small amount of tear-out can be tolerated in a pulping chip forming blanking procedure such as the present invention involves, and a fundamental object and advantage of the present invention is that, even though large pulping chips are formed, the use of climb milling, proper cutter knife angles and self-cleaning chip forming cutter heads reduces tear-out to within tolerable limits for at least most grades of lumber, thus achieving for the first time the very important commercial objective of forming pulping chips from only the excess width and/or thickness dimensions of rough lumber and providing a valuable by-product from a portion of the lumber formerly considered wastage.

It is a further basic object and advantage of the present invention to provide operation of one or more chipping heads in conjunction with a finishing operation such as a high speed planar, the conjunctive operation being in a manner so that uniform sized pulping chips are obtained from the one or more chipper heads irrespective of variations in rate of lumber feed past the chipper and finishing processing stages.

It is a further object of the present invention to form pulping chips highly uniform as to length and width and ideally adapted to pulp digestion processing, relatively large chip thicknesses being obtained without objectionable tear-out of the lumber stock by adoption of climb milling techniques. Further and related advantages of the present invention in this regard involve arrangement of the cutting knives of a chipper head to practically insure that each chip removed is cut once and once only by cutting knives arranged at particularly advantageous angles of cut and driven at rotational speeds selected to give optimum chip form as to length and thickness.

Yet another object and advantage of the present invention is to provide chip producing equipment and control means therefor by which chip size is automatically held uniform yet nevertheless selectively variable in a predetermined manner as to length, shape and thickness.

Yet another object and advantage of the present invention is to provide pulping chip forming units or assemblies adapted to or readily adaptable to use with conventional finishing equipment such as high speed planers, matchers, surfacers, molders or profilers.

A further object and advantage of the present invention, as respects the detailed form of chipper heads employed, involves utilization of stacked disc type chipper heads with a staggered arrangement of cutting knives and cut-away throat portions between the cutting knives, such staggered arrangement presenting helically arranged paths for ready withdrawal and self-cleaning of the chips from the chipper head as they are formed, advantageously but not necessarily with conjuctive blower means, thus insuring that substantially the entire chip output from a chipper head is cut once and once only.

A further object and advantage of the present invention is to provide means by which chips suitable for pulping are removed from rough lumber stock incident to the finishing of same, the pulping chips being cut only substantially in the direction of the grain of the stock and "climb" cut to minimize and even completely eliminate tear-out of the blanked lumber. A further object of the present invention in this regard is to provide modified chipper head placement with respect to the direction of feed of the lumber stock so that an acute angle is formed as between the direction of feed and axis of rotation of the chipper head, to further facilitate removal of the chips from the stock and withdrawal of the cut chips from the cutter head without further cutting thereof.

Yet another object and advantage of the present invention is to provide, in conjunction with a high-speed finishing operation such as a high speed planer, a chipper head unit or chipper head assembly requiring substantially reduced driving power, by virtue of its utilization of climb milling rather than cut milling for chip removal.

It is yet another and fundamental object and advantage of the present invention to provide chip forming mechanism, readily operable in conjunction with finishing equipment such as a high speed planer, by means of which the rate of feed of the lumber stock being processed through the equipment is automatically related to the rotational speed of the chip forming knives to give highly uniform chips ideally suited for pulping, and having a substantially uniform fibre length between about ⅜ inch and about 1 inch. Stated otherwise, it is an object and advantage of the present invention to provide a manner of operation of a chipper unit in conjunction with a high speed finishing unit such as a high speed planer in a manner so that a chip forming knife will strike a given grain line of the lumber stock, i.e. parallel to the direction of feed thereof, from about 10 to 30 times per foot of feed.

Yet a further and more specific object and advantage of the present invention involves utilization of a chipper head in a chipper unit, formed of a stacked series of staggered knife carrying discs, each disc carrying a plurality of knives, the stack of discs being at least sufficient in dimension to span the dimension of the lumber stock it faces, and the number of knives per disc and rotational speed of the cutter head being related to the rate of feed of the lumber stock to give a predetermined highly uniform chip character to the chips formed. A further object and advantage in this regard involves improvement of pulping chip character by utilization of a relatively large number of knives per disc and relatively low chipper head rotation speed in conjunction with removal of the chips by climb milling, without excessive tear-out of the lumber blanked.

These and other objects and advantages of the present invention will be apparent from the following presentation of the various examples of equipments, control systems and modes of operation thereof.

In order to illustrate various non-limitive forms of equipments and control systems utilizing the present invention and discovery, reference is made to the following description and accompanying illustrations, wherein like numerals refer to like parts and prime numerals refer to similar parts, and wherein:

FIG. 1 is a side view, diagrammatic in character, showing a lumber finishing line including a conventional planer having in combination therewith a side chipper unit;

FIG. 2 is a side view, diagrammatic in character and similar to FIG. 1, showing a conventional planer having in combination therewith a top chipper unit;

FIG. 3 is a side view, diagrammatic in character and similar to FIGS. 1 and 2, showing a conventional planer having in combination therewith a composite chip blanking assembly, including an infeed unit, a top chipper unit, and a side chipper unit;

FIG. 4 is a side elevational view on a larger scale of the side chipper unit shown in FIG. 1;

FIG. 5 is a top view, partly in cross section, of the side chipper unit shown in FIG. 4, taken substantially along line 5—5 thereof;

FIG. 6 is a transverse cross sectional view, with certain parts shown in side elevation, further illustrating the side chipper unit of FIGS. 4 and 5, and taken substantially along line 6—6 of said FIG. 5;

FIG. 7 is a side elevational view on a larger scale of the profile or top chipper unit shown in FIG. 2, taken substantially along line 7—7 of FIG. 8;

Figure 21:
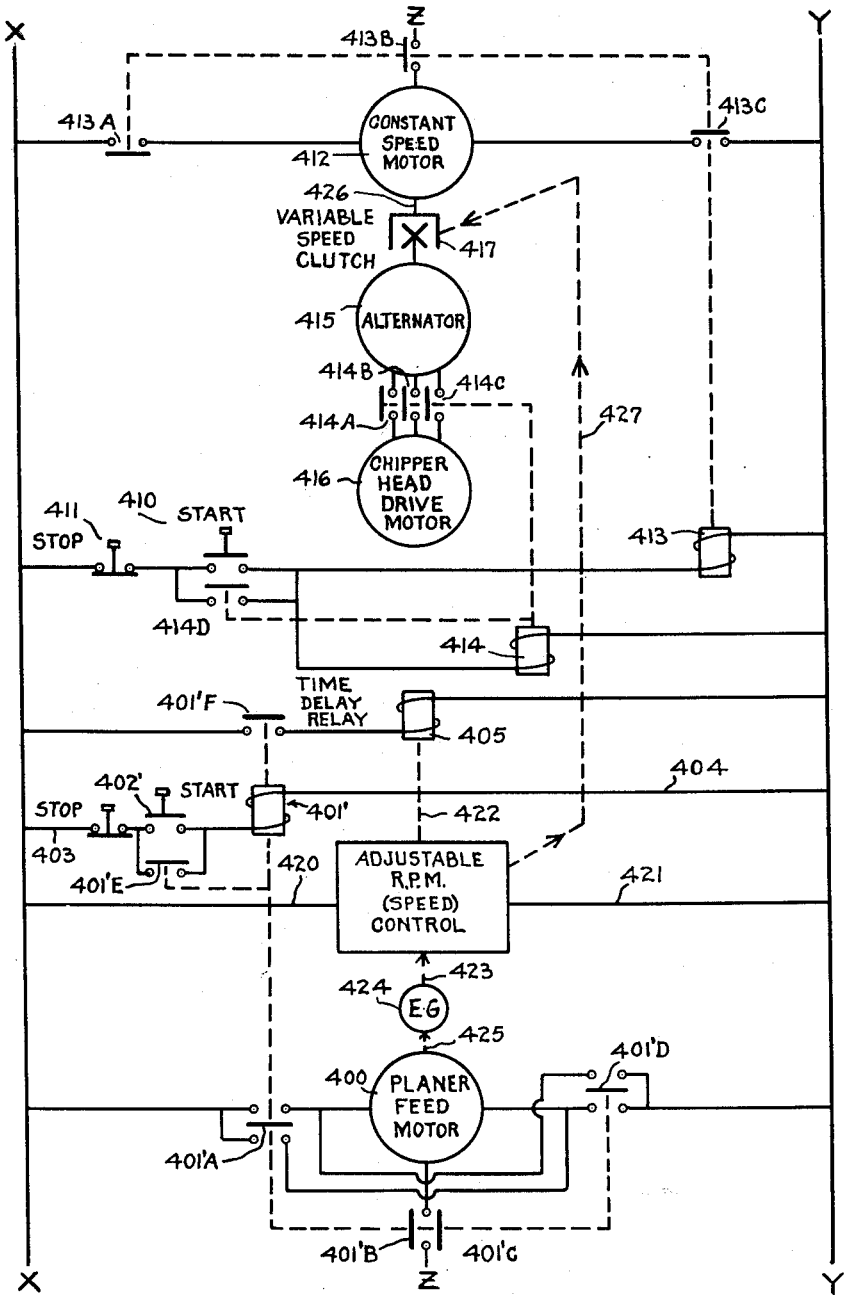
Figure 22:
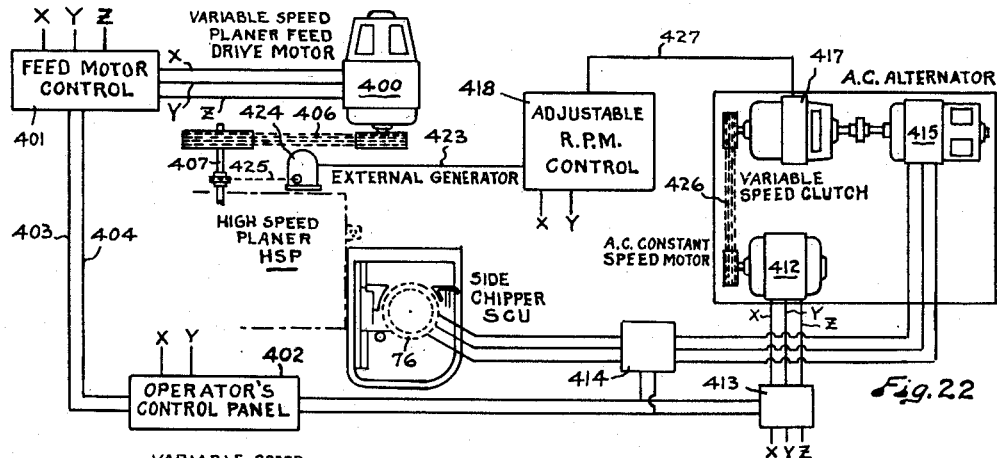
Figure 23:
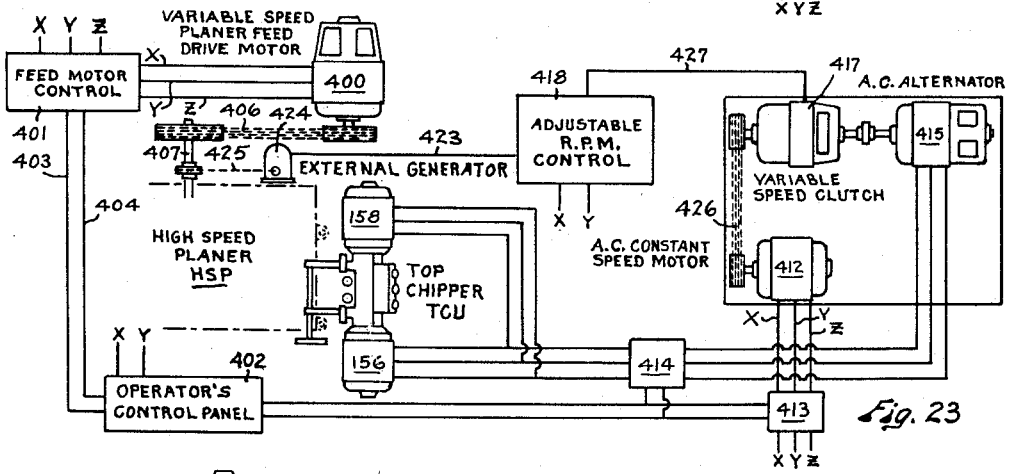
Figure 24:
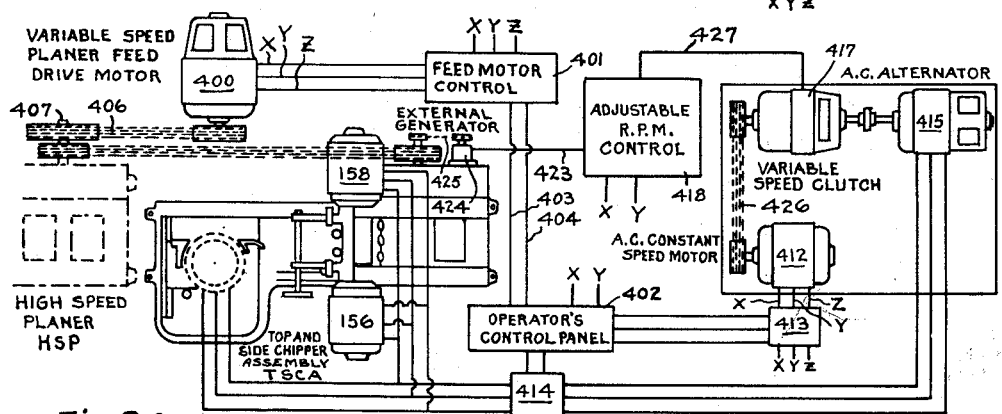

FIG. 8 presents a top plan view, with various portions shown in cross section, of the top chipper unit shown in FIGS. 2 and 7;

FIG. 9 presents a transverse cross sectional view of the top chipper unit shown in FIGS. 2, 7 and 8, taken substantially along line 9—9 of FIG. 8;

FIG. 10 presents a top plan view at a reduced scale of a modified form of top chipper head arrangement similar to that shown in FIG. 8, wherein the axis of rotation of the chipper head is arranged at an acute angle with respect to the direction of feed of the lumber;

FIG. 11 presents a detailed plan view of one typical form of side chipper head, having three stacked discs and four knives per disc, suitable for practice of the present invention;

FIG. 12 presents a side view, partially in cross section, of the side chipper head illustrated in FIG. 11, taken substantially along line 12—12 thereof;

FIG. 13 presents another form of chipper head arranged, for example, for use as the top chipper head in the top chipper unit illustrated in FIGS. 7–9, having four knives per disc and having removable blade carrying segments;

FIG. 14 is a fragmentary cross sectional view, taken substantially along a diametral line of FIG. 13, illustrating the stacked arrangement of the various cutter carrying discs making up the chipper head;

FIG. 15 presents a plan view of a further modified form of chipper head, made up of several stacked discs, each having six cutter knives per disc, stacked to form the cutter head for a top chipper unit, such as illustrated in FIGS. 7–9;

FIG. 16 presents a fragmentary side view, partially in cross section, of the chipper head illustrated in FIG. 15, taken substantially along line 16—16 thereof;

FIG. 17 presents enlarged and somewhat idealized side views of various forms of chips, illustrating the relation and effect of climb milling according to the present invention as compared with cut milling and illustrating the relation and effect of the number of cutter knives per disc making up the chipper head as well as the comparative feed and chipper head rotational speeds, demonstrating that shorter and relatively thicker chips, which are most desirable for pulping, are obtained by climb milling with a relatively large number of cutter knives per disc and correspondingly relatively low chipper head rotational speeds;

FIG. 18 presents an enlarged side view of a composite chipper assembly comprising a top chipper unit and a side chipper unit, with separate infeed mechanism, such as is usable either in conjunction with a conventional planer as shown in FIG. 3, or as a separate unit for blanking lumber to uniform width and dimension prior to kiln drying, for example;

FIG. 19 is a top plan view, of a fragment of the composite chipper assembly shown in FIG. 18;

FIG. 20 is a fragmentary cross sectional view of the assembly illustrated in FIGS. 18 and 19, taken substantially along line 20—20 of FIG. 19;

FIG. 21 illustrates in ladder diagram form a typical electrical control circuit for correlating the lumber feed speed and chipper head rotational speed in the manner taught by the present invention;

FIG. 22 presents schematically and by block diagram typical control components and circuitry by means of which the drive of the conventional feed motor and a side chipper unit motor are automatically correlated to give uniformity of chip lengths regardless of changes in speed of feed of lumber through the equipment, with conventional components and control circuitry being shown by dotted line, and with the additional components and control circuitry characterizing the present invention being shown by solid line;

FIG. 23 is a view similar to FIG. 22, showing the components and control circuitry involved for an installation having a top chipper used in combination with a conventional planer in accordance with the present invention and discovery; and FIG. 24 presents a schematic and diagrammatic layout of components and control circuitry utilized for correlative synchronization of both a side chipper unit and a top chipper unit when a chipper assembly such as shown in FIGS. 3 and 18 is used either alone or in combination with equipment for further finishing, such as a high speed planer.

Turning to a more detailed consideration of the various forms of equipment and control systems illustrated to exemplify practice of the present invention and discovery, FIGS. 1, 2 and 3 present side views, somewhat diagrammatic in character, respectively showing a side chipper unit, a top chipper unit, and a composite side and top chipper assembly, each used in conjunction with a conventional high speed planer.

In FIG. 1, side chipper unit SCU is mounted at the infeed end of a conventional high speed planer HSP, rough lumber being fed to the side chipper unit SCU from a conventional infeed table IFT. High speed planer HSP is of any suitable type known to the art, such as disclosed in the aforesaid Nicholson et al. 2,276,240, or in Nicholson et al. 2,102,186, Nicholson 2,204,439 or Pritchard 2,738,-813. For illustration, high speed planer HSP comprises basically the diagrammatically indicated four roll feed 50 a top planer cutter head 51, a bottom planer cutter head 52, opposed side planer cutter heads, one being shown at 53, top and bottom pattern heads 54 and 55 and outfeed rolls 56. It will be understood that in this type of equipment that the feed rolls 50 and 56 are driven by a feed drive motor, not shown, which is operable at selectively variable speeds under control of an operator. It will be further understood that top and bottom planer heads 51 and 52, side cutter heads 53, and top and bottom pattern heads 54 and 55, when present, are separately driven from one or more drive motors, a drive motor for the side planer cutter head 53 in view being shown at 53a.

Conventional infeed table IFT, as diagrammatically presented in FIG. 1, comprises driven feed rollers 60, a feed table frame 61, a holddown bar 62, and a bridge plate 63.

Details of construction of side chipper unit SCU of FIG. 1 are set forth in the discussion of FIGS. 4, 5 and 6, presenting various enlarged and more detailed views thereof.

The lumber finishing line shown in FIG. 2, is like that shown in FIG. 1 except that a top chipper unit TCU is employed rather than a side chipper unit. Similarly, the finishing line shown in FIG. 3 is like that shown in FIGS. 1 and 2 except that the functions of the side chipper unit and top chipper unit are combined into a combined top and side chipper assembly TSCA.

From a comparison of FIGS. 1, 2 and 3, it will be seen that the high speed planer HSP and infeed table IFT are the same in each instance and that the details and operation thereof do not form any part of the present invention, except as to the combination and correlation thereof with a side chipper unit (FIG. 1), a top chipper unit (FIG. 2), or a top and side chipper assembly (FIG. 3) as the case may be.

It is further noteworthy with regard to the nature of the present invention that a top and side chipper assembly TSCA, such as shown in FIG. 3, also has independent utility as a separately operated unit for blanking rough lumber stock prior to kiln drying thereof, or the like.

Constructional details of side chipper unit SCU, shown somewhat diagrammatically in FIG. 1, are further presented in enlarged views of FIGS. 4, 5 and 6, FIG. 4 being a side elevational view thereof, FIG. 5 being a top view thereof partly in cross section, and FIG. 6 being a transverse cross sectional view with certain parts shown in elevation.

Side chipper unit SCU comprises a side chipper head 70 made up of a series of stacked and rotationally staggered knife mounting discs 71, 72 and 73. Chipper head 70 is driven in the direction indicated at 74 (FIGURE 5) to climb mill the rough lumber RL being fed in the direction indicated at 75. Chipper head 70 is rotated in direction 74 by side cutter head drive motor 76 through drive arbor 77 (FIGURE 6), tapered end 78 of which receives a clamping sleeve 79, held thereon by lug means 80, set washer 81, split washer 82 and cap nut 83 threaded on threaded end 84 of said arbor end 78. Clamping sleeve 79 engages the stacked chipper head discs 71, 72 and 73, retaining the same in the staggered arrangement shown (FIGS. 5 and 6). Drive arbor 77 rotates in sleeve 85 by means of sealed bearing 86, and said sleeve 85 is selectively vertically positionable in split motor mount bracket 87 by means of vertical adjustment screw 88 (FIGURE 4), and lock screw 89, in a manner conventional per se in construction of side planers or pre-hoggers. Similarly, transverse adjustment of the position of side chipper head 70 is provided by means of transverse adjustment screw 90 and lock screw 91, a portion of the transverse adjustment screw being shown in FIG. 5 at 92, in a manner also conventional per se in planer side head and pre-hogger construction. Side chipper unit frame 100 is provided with a bolting face 101 for attachment thereof to high speed planer HSP in the position shown in FIG. 1. Holdover roller 102 is also provided, and is transversely adjustable on frame 100 by means of guide slot 103, guide block 104, adjustment screw 105 and hand crank 106 providing means by which the equipment line can be operated either with or without the chipper head unit SCU, holdover roller 102 being retracted from engagement with the rough lumber RL when the chipper head 70 is used, and advanced to engagement with the rough lumber RL when chipper head 70 is not used, such as when a given run of lumber has been blanked before drying or does not provide sufficient excess width dimension to permit pulping chips to be formed.

Also mounted on side chipper unit frame 100 is spring loaded pressure shoe 110, pressure shoe arm 111 linking said pressure shoe 110 with a pivot shaft 112, said pressure shoe 110 thus being spring loaded by means of spring 113 (FIG. 6) to pivot about said pivot shaft 112 and ride in pressure engagement with the rough side of rough lumber RL. Pressure shoe 110 is of the yielding type and automatically rides over and maintains rough lumber RL against fence 114 regardless of variation in width thereof. A fixed, i.e. non-yielding, pressure shoe 115 is arranged to be transversely adjustable on mounting block 116 by means of screw shaft 117 and adjustment hand wheel 118, and engages the blanked side surface of the rough lumber RL after removal therefrom of the excess dimension cut into chips by chipper head 70. It will be apparent that since the line of cut of chipper head 70 is fixed with respect to fence 114, the dimension of rough lumber RL beyond chipper head 70 will be substantially uniform and that pressure shoe 115 is desirably of a fixed character.

Cutter head 70 is provided with a blower hood 120 having a discharge opening 121, advantageously in communication with blower or exhaust means (not shown), as desired.

Also provided in conjunction with fence 114 and pressure shoes 110 and 115 are bed plate 119 and holddown roller 122, the latter being mounted on floating arm 123 and spring loaded as by spring 124 acting about pivot 125 on fixed upright 126 to maintain such pressure roller 122 in downward pressure engagement with rough lumber RL as it is fed past chipper head 70.

FIGS. 7, 8 and 9 respectively present enlarged side elevational, top plan and transverse cross sectional views of the top chipper unit TCU shown diagrammatically in FIG. 2. In the arrangement shown at FIGS. 7, 8 and 9, top chipper head 150 is made up of 14 stacked discs, one being shown at 151, said stacked discs each mounting four cutter knives, the cutter knives being staggered or stepped helically from disc to disc. Stacked discs 151 are keyed by keys 152 to shaft 153 and locked thereon by suitable means such as retaining ring 154 and threaded nut 155. Shaft 153 driven by drive motor 156, is in splined engagement with shaft 157 driven by motor 158. Thus, drive motors 156 and 158 constitute complementary drive means for said top chipper head 150. The rough lumber RL is climb milled by chipper head 150, the direction of feed of rough lumber RL being indicated at 159 (FIGURE 9) and the direction of rotation of chipper head 150 being indicated at 160.

Frame 161 of the top chipper unit TCU is provided with bolting faces 162 (FIGURE 7) and 163 for mounting thereof to a conventional high speed planer HSP in the manner indicated in FIG. 2, as by bolt means, one of which is indicated at 164 (FIG. 9).

As is conventional per se, drive motors 156 and 158 are provided with cooling ducts 165 and 166.

Frame 161 includes a fixed bed plate 170, supporting rough lumber RL against the pressure of yielding pressure shoes 171 and fixed pressure shoe 172. Spring loaded yielding pressure shoes 171 are desirably each provided with a rough lumber RL engaging roller 173. Spring loaded yielding pressure shoes 171 are selectively adjustable, as to degree of pressure exerted, by means of manually actuated adjustment screws 174 varying the length and therefore degree of pressure exerted by springs 175. As will be noted from FIG. 8, three spring loaded yielding pressure shoes 171 are provided in view of the substantial width of the rough lumber RL.

Fixed pressure shoe 172 is selectively adjustable vertically by means of manually actuated screw shafts 176, two being provided to permit selective adjustment and leveling of said shoe 172. Chipper head subframe 180 is vertically settable on stands 161a of frame 161 by means of motorized hoist 181 (also provided with manual set means 182). Vertical adjustment of said subframe 180 enables establishment of the desired thickness setting as between bed 170 and the cutting line of the knives of top chipper head 150. When the desired thickness setting is established, locking gibs 183 and 184 function to clamp said subframe 180 to frame stands 161a through action of hand wheel 185 and associated screw shaft 186.

FIG. 10 presents in reduced scale a slightly modified form of top chipper unit, comparable to the view of FIG. 8 but having the axis of rotation of the chipper head set at an acute angle of about 70° with respect to the direction of feed of the lumber. Ideally, when the chipper head is positioned with its axis of rotation other than perpendicular with respect to the direction of feed of the rough lumber, the helical arrangement of the throats or gullets between the cutting knives of the chipper head should be related to the angle of the axis of rotation of the chipper head to promote self-cleaning of the chipper head and rapid removal of the formed chips. Also, the staggered or helical pattern of the chipper head cutting knives should be related to the angle of the axis of rotation of the chipper head so that a given chip is removed by a given knife without upset of the next portion of the rough lumber stock next to be cut.

Thus, in FIG. 10, the axis of rotation 190 of chipper head 150 is disposed transversely across the rough lumber RL at about 70° with respect to the direction of feed 191. It is noteworthy in the arrangement shown in FIG. 10 that the helical pattern of the cutter knives (192 and 193 for example) of chipper head 150 is set so that a leading cutter knife 192 mills slightly across the grain and removes its chip, leaving the way clear for removal of the next chip by the cutter knife 193 next following.

Rotation of chipper head 150 in the direction 160 is such as to urge the rough lumber RL against fence 194. In other words, the fence 194 associated with the angled chipper head 150 of FIG. 10 is on the side of rough lumber RL toward which the discs 151 of head 150 are canted.

FIGS. 11 and 12 present detailed plan and side views, the latter being partially in cross section, of another typical form of side chipper head adaptable for use in side chipper unit SCU, such as illustrated in FIGS. 4, 5, and 6.

In FIGS. 11 and 12, a modified form of side chipper head is shown, embodying discs 201, 202 and 203, each constituted by four integral cutter knives arranged progressively at 90° points to the direction of rotation, with the cutter knives of the successive discs 201, 202 and 203 staggered in a manner so that only one cutter knife is engaged with the side of the rough lumber at any one time. Said cutter discs 201, 202 and 203 are mounted on clamping sleeve 204 in such a manner by means of bolts 205, 206, 207 and 208, clamping the same to lug ring portion 209 of said clamping sleeve. The upper end of said clamping sleeve 204 is provided with a seating ring 210, comparable to seating ring 80 shown in the assembly of FIG. 6. In specific detail, the various cutter knives are advantageously of a configuration so that the leading angle thereof is about 33°–48° and preferably about 43° with respect to an imaginary radius at the knife point, and the trailing surface is arranged at an angle of at least 7° with respect to a tangent through the knife point. Generally, the most desirable knife angle or that angle at which the knife is set as it attacks the board will be slightly different for each species of lumber whether such is to be dry or green material. If the knife angle is not steep enough, breaking or bending of the chip fiber as it is being removed from the lumber occurs, causing brooming or bruising on the end of the chip, resulting in too fast penetration of the cooking liquors of the pulp mill digester. If the knife angle is too steep a very flat chip is obtained and the susceptibility to excessive tear-out is increased.

The throat or gullet portion between a given cutter knife and the cutter knife next following is of smooth contour, as shown in FIG. 15, for example, so that the rapid removal of formed chips is not impeded to any material extent.

FIGS. 13 and 14 respectively present the arrangement of stacked cutter discs to form a top chipper head such as indicated at 150 in FIG. 8, each of the discs 215, 216, 217, 218, 219, 220 and 221 being identical except for the placement of keyways 222 and 223 and except for the provision of an external bevel 224 in the facing discs, one such bevel being shown at 224 on disc 215. Each of said cutter discs 215–221 mount a plurality, four being indicated, of cutter inserts 225 each having a saw-toothed surface 226 mating with a similar surface 227 in the cutter discs, and held in preset position by means of holding gib 228 and a gib lock bolt 229.

It will be understood that any desired number of knife mounting discs 215–221 can be stacked to make up a desired width dimension, such as the fourteen shown in FIG. 8, for a given top chipper head.

FIGS. 15 and 16 disclose another form of stacked disc arrangement making up a typical chipper head, this form being of the type to form a top chipper head comparable to chipper head 150 shown in FIG. 8, for example, the actual forms shown in FIGS. 15 and 16 utilizing integral knives on a series of staggered and stacked chipper discs. Each chipper disc 230, 231, 232, 233, 234, 235 and 236 has six cutter knives and is identical with the others except for respective positioning of keyways 237 and 238 therein, and except for the provision of an external bevel on the facing discs, one being indicated at 239 on disc 230. Keyways 237 and 238 are of course being positioned to provide the staggered cutter knife arrangement and helical gullet pattern shown. It will be readily understood that any desired number of stacked discs can be so arranged, and that such are held in fixed position when assembled as the top chipper head of a top chipper unit, in the manner shown at FIG. 8, for example.

As will also be apparent from FIG. 15, the configuration of a given gullet, say 240, following a given cutter knife, say 241, is of a smooth and even-flowing character to minimize any possibility that chip discharge will be interrupted, it being important to uniform chip size and shape that each chip formed be cut once and once only.

The width of the chips formed is controlled by selection of the appropriate disc width. Keeping in view that in a given chipper head assembly, whether in a side chipper unit or a top chipper unit, the number of knives per disc can be selected as desired, it will be apparent that the fibre length of the chips formed is governed by the number of knife marks per foot on the lumber as directly related to the feeding rate of the lumber and the r.p.m. of the cutter head times the number of knives on the chipper discs. Thus, with a feed rate of 724 ft. per minute of the lumber passing through the machine and with four-knife chipper discs revolving at 3450 r.p.m., a knife mark would appear on the lumber every 5/8 inch along a given grain thereof, producing chips each having a fibre length of about 5/8 inch.

Also with respect to the nature of the chips formed, it has been determined that climb milling is much more satisfactory than cut milling not only insofar as minimization of tear-out, but in the nature of the formed chips as well. In order to illustrate these points, and to further compare the effect of the relative number of knives per disc and of the relative rate of rotation of the chipper head, FIG. 17 presents a series of chips A, B, C and D of somewhat idealized form showing the respective overall length, thickness and shape of chips formed under four directly comparable operating conditions. All of chips A, B, C and D basically have a fibre length of 5/8 inch, in that they are all formed by a knife striking the lumber every 5/8 inch along a given longitudinal line. Chip A shows the chip resulting when cut milling with a four-knife head 11 inches in diameter, at a feed rate of 724 ft. per minute, the four-knife head being rotated at 3450 r.p.m. As will be observed, the cut milled chip A is relatively long and thin. Generally, the longer and thinner the chip form, the greater the amount of "fines" produced, because of the comparative fragility of the tail portion of the chips. The higher the "fines" content, the lower the proportion of usable chips formed, i.e. the lower the quality index (Q.I.).

Chip B is the form of chip resulting from climb milling under directly comparable conditions, i.e. four-knife head of the same size, a feed rate of 724 ft. per minute, and a chipper head rotation speed of 3450 r.p.m. As will be observed, chip B is substantially shorter and thicker, with greater uniformity as to fibre length, i.e. the length of the lumber grain along the chip.

Chip C illustrates the degree of improvement when the number of cutter knives per disc is doubled and the chipper head rotational speed correspondingly halved. Maintaining the feed at 724 ft. per minute, and with 11 inch diameter chipper discs each mounting eight cutter knives and driven at a rotational speed of 1725 r.p.m., climb milled chip C is again materially shorter and thicker than even chip B, again lending improved uniformity to the fibre length and quality of the chip. For further comparison, chip D shows the chip size and shape when climb milling with an 11 inch diameter head having sixteen-knife chipper discs rotating at 862.5 r.p.m., while maintaining the lumber feed at 724 ft. per minute. As will be observed, chip D is still shorter and still thicker than the chips obtained with either four-knife cutter discs (chip B) or eight-knife cutter discs (chip C), clearly indicating that optimum chip size and shape for pulping purposes is obtained when a relatively large number of knives per disc is selected, and the climb milling is done at relatively low rotational speeds of the chipper head.

When climb milling, according to the present invention, with the staggered-tooth chipper head arrangement and control therefor as presented, a remarkable degree of uniformity of formed chip is accomplished by virtue of the following factors: (1) the width of the chip is determined by the width of the individual knife mounting discs making up the chipper head, (2) the length of chip will be determined by number of knife blades in a given cross section of the head, by the radius of the head, by the speed of rotation thereof, and the speed of feed of the lumber, and (3) chips of substantially uniform fibre length are not further broken up because of the deep throat or gullet design of the knife mounting discs and the staggered, helically disposed arrangement of such discs, since as a result of said staggered or helically disposed arrangement one edge of each throat portion is open providing a self-cleaning action, the deep throat portions extending from each knife blade further serving to deflect a chip upwardly from the blade without fracture or curl of the chip.

While the upper limit of fibre length in the chip is indicated to be about one inch, the maximum tolerable fibre length is determined largely by the degree of scalloping which can be tolerated in the blank lumber being fed to the planer heads.

Turning to a consideration of the combined top and side chipper assembly TSCA, as shown in the machining line presented diagrammatically in FIG. 3, FIG. 18 presents this type of machine in an enlarged and somewhat more detailed side view, FIG. 19 presents a fragmentary plan view thereof, and FIG. 20 presents a fragmentary cross sectional view, taken substantially along line 20—20 of FIG. 19.

Generally speaking, the top and side chipper assembly TSCA, incorporates a side chipper unit similar to that illustrated in FIGS. 4–6 and a top chipper unit similar to that illustrated in FIGS. 7–9, together with an infeed assembly to supply the additional feed power required. As such, a top and side chipper assembly TSCA can be used either as a separate blanking step, as to uniformly dimension rough lumber prior to drying and/or grading thereof, or can be used in conjunction with a finishing machine such as the high speed planer HSP shown in FIG. 3.

Since the side chipper portion and the top chipper portion of the combined assembly illustrated in FIGS. 18–20 are basically the same as disclosed and earlier discussed, prime numerals have been used to indicate like parts where appropriate.

Thus, the combined top and side chipper assembly basically comprises a feed works, generally indicated at 300, which is generally conventional per se, a top chipper unit TCU', and a side chipper unit SCU'. The drive for feed works 300 is from power input shaft 301, chain 302, sprockets 303 and 304 on jack shaft 305, thence through chain 306 in turn driving fixed lower feed roll 307. Sprocket 308 and sprocket 309 in turn drive sprocket 310 which through chain 311 drives floating feed roll 312, said floating feed roll 312 being provided with conventional guideways, one being indicated at 313. Main frame 314 mounts feed bed plates 315 and 316. The entire feed works 300 has been somewhat diagrammatically presented in FIG. 18 because the various components thereof form no part of the present invention, except in combination with a top chipper unit and side chipper unit making up the composite assembly TSCA.

Top chipper unit TCU′ is basically similar to top chipper unit TCU, illustrated in FIGS. 7–9. Top chipper head 150′ is made up of 14 stacked discs, one being shown at 151′, and is driven by drive motors 156′ and 158′ to climb mill the rough lumber RL being fed in the direction indicated at 159′, the direction of rotation of chipper head 150′ being indicated at 160′.

Frame 161′ mounts an extension of feed bed plate 316, supporting rough lumber RL against the pressure of yielding pressure shoes 171′ and fixed pressure shoe 172′. Yielding pressure shoes 171′ are spring loaded by spring means, one such being indicated at 175′ and are mounted in selectively releasable pressure engagement with the rough lumber RL by manually operated pressure shoe lift mechanism, generally indicated at 317. Lift mechanism 317 is conventional per se and includes linkages 318, 319 and 320, as well as over-center link 321, weights 322, and manually actuated pressure release lever 323, by means of which the yielding pressure shoes 171′ can be disengaged from the rough lumber RL in the event clogging occurs, and to facilitate cleaning of the feed area in the vicinity of the top chipper head infeed.

Fixed pressure shoe 172′ is selectively adjustable vertically by means of manually actuated screw shafts 176′. Chipper head subframe 180′, also known as a yoke, is vertically settable on stands 161a′ by means of motorized hoist 181′, vertical positioning thereof being facilitated by height indicating means 325 (FIGURE 18). Said subframe 180′ is lockable at any given vertical setting by means of locking gibs 183′ and 184′ pinching slideways 326 and 327 through action of hand wheel 185′ and associated screw shaft 186′, in a manner also conventional per se.

Between top chipper unit TCU′ and side chipper unit SCU′ there is positioned holdover roller 102′, transversely positionable on side chipper unit SCU′ subframe 100′ by means of guide slot 103′, guide block 104′, adjustment screw 105′ and hand crank 106′.

As indicated with respect to holdover roller 102 in the side chipper unit SCU illustrated in FIGS. 4–6, said holdover roller 102′ is retracted from engagement with the rough lumber RL when the side chipper head 70′ is used, and advanced to engagement when chipper head 70′ is not used.

As will be apparent, side chipper unit SCU′ further comprises drive motor 76′, split motor mount bracket 87′, vertical adjustment and lock screws 88′ and 89′, traversing screw 90′, lock screw 91′, cooperating with slideway 330 and locking gib 331, and adjustable stop 332 (FIGURE 18), provided for ready reset.

Also mounted on subframe 100′ is spring loaded pressure shoe 110′, pressure shoe arm 111′ linking said pressure shoe 110′ with a pivot shaft 112′, said pressure shoe 110′ being spring loaded by means of spring 113′. Fixed pressure shoe 115′ is transversely adjustable on mounting block 116′ by means of screw shaft 117′ and adjustment hand wheel 118′.

Also associated with chipper head 70′ is blower hood 120′ having discharge opening 121′.

Fence 114′, bed plate 119′ and holdover shoes 110′ and 115′ act in conjunction with the holddown roll 122′, mounted on pivot arm 123′ and spring-loaded by spring 124′ to maintain the rough lumber RL in proper position as it is fed past chipper head 70′.

As will be evident, the make-up of combined top and side chipper assembly TSCA is basically the composite of top chipper unit TCU and side chipper unit SCU, and provides simultaneous chip formation from both top and side excess dimensions when the rough lumber RL being machined renders such practicable. It will be evident that either the top chipper head or the side chipper head of the assembly can be used alone, as desired, should a given run of rough lumber RL be such that only the side or thickness dimension can be removed practically prior to finishing.

It will be further understood that when a composite assembly TSCA is employed, the rotational speeds of the respective top chipper head 150′ and side chipper head 70′ are desirably both correlated with the lumber feed speed to form essentially the same size chips. Of course, it is easily within the capability of the assembly for a given, pre-selected size chip to be produced by the top chipper head and another, pre-selected size chip to be formed by the side chipper head. This is not normally done, however, since uniformity of chips to fill a given order is normally preferred and it is usually desirable to merely combine both chip outputs without separate handling.

It is to be again emphasized that a very important and basic feature of the present invention and discovery is the maintenance of the same fiber length of the formed chips, regardless of variation in the lumber feed rate. In order to operate a machine line or combined top and side chipper assembly, as the case may be, in this manner, the revolutions per minute of the chipper head or heads must be varied in direct relation to the lumber feed rate. In other words, for example, to obtain chips with ⅝ inch fibre length at 724 ft. per minute feed rate with four knives per chipper head disc and with the chipper head disc revolving at about 3450 r.p.m., the lumber feed rate when reduced by half necessitates the corresponding reduction of the chipper head r.p.m. by one-half, or to about 1725 r.p.m., in order to maintain the same chip fibre length.

In order to accomplish this basic object and advantage characterizing the present invention, several types of control systems can of course be evolved. Fundamentally, however, any such control system having this capability must incorporate automatic or semi-automatic regulation of the rotational speed of the chipper head or chipper heads in direct response to a given feed speed or variation in the feed speed.

FIG. 21 presents by ladder diagram a typical control circuit accomplishing this result, and FIGS. 22, 23 and 24 respectively illustrate schematically and diagrammatically the general layout of control systems for equipments incorporating a side chipper unit alone, a top chipper unit alone, and a combined top and side chipper assembly.

Turning to a more specific consideration of the ladder diagram presented in FIG. 21, and also relating the same to the various diagrams presented in FIGS. 22, 23 and 24, it will be understood that conventional finishing equipment such as a high speed planer HSP includes as conventional equipment a variable feed drive motor 400, which can be either A.C. or D.C. in character, an A.C. motor delivered 3-phase power at 440-v. A.C. from lines X, Y and Z being selected for purposes of illustration. Coupled with planer feed drive motor 400 as conventional equipment is a feed motor control 401 in turn controlled from an operator's control panel 402, the nature of the control being such that the feed drive motor can be jogged or continuously operated in either direction under control of the operator. In this regard, the only feature of the conventional feed motor control circuitry of particular interest to the present invention is the control contactor mechanism, schematically presented in FIG. 21 at 401′, selectively energized from control power lines 403 and 404 through a start button schematically indicated at 402′. It will be readily understood that this control system is conventional per se in the art and includes mechanism for energizing planer feed motor 400 in either desired direction, either jogged or continuously, the contactors for this purpose being schematically indicated at 401'A, 401'B, 401'C and 401'D. It will also be understood that conventionally incorporated in the planer feed motor control circuit is a suitable interlock mechanism for continuous operation, schematically indicated at 401'E.

In adapting the conventional control circuit for purposes of the control circuitry characteristic of the present invention, a further set of contacts 401'F, controlled by planer feed drive motor control relay 401', are employed to selectively energize time delay relay 405, the function of which will be discussed hereinafter.

It will be further understood, that a conventional control panel 402 for a finishing mechanism such as a high speed planer HSP includes electrical contactors for all of the cutter head motors as well as for starting the feed motor under the operator's control, and that some planers drive the various planer heads either from a common drive or separately.

Further, in a conventional high speed planer installation, a feed motor 400 is mechanically connected through belts and pulleys 406 to the input shaft 407 of the planer, and thus drive the planer at a pre-selected rate of feed dictated by the conditions in the mill as to the size of the lumber and type of finish, quality, etc., desired.

Each chipper head is individually controlled as respects the planer heads, in all of the arrangements shown in FIGS. 22–24, so that the operator can independently start or stop the chipper head or heads at his discretion. The only electrical relationship between the chipper head or heads and any other motors in the complete finishing system is that their respective temperature overload relays (not shown) are wired in series so that when a motor failure occurs at any one of the chipper head or heads or at any one of the surfacing heads in the planer, the planer feed motor will be stopped so that flow of lumber into a dead cutter head or dead chipper head does not occur.

The basic components of a given chipper head electrical control system include the start control button 410 and a stop control button 411 for the individual chipper head motor or motors, which control buttons in physical layout are added to the existing operator's control panel 402 to control the A.C. constant speed motor 412 by action of constant speed motor control relay 413 energizing said constant speed motor 412 upon closure of contacts 413A, 413B and 413C (FIGURE 21) connecting the power lines X, Y and Z to said constant speed motor 412.

Actuation of chipper head start button 410 also energizes chipper head motor control relay 414 which in turn closes contacts 414A, 414B and 414C thereof, delivering excitation power from alternator 415 to the chipper head motor generically designated at 416 in FIG. 21, it being understood that the chipper head drive motor for side chipper head unit SCU is motor 76, is so designated in FIG. 22, is motors 156 and 158 in the top chipper unit TCU and is so designated in FIG. 23, or is the top chipper unit TCU drive motors 156' and 158', as well as the side chipper drive motor 76' in the composite top and side chipper assembly TSCA, and so designated in FIG. 24. Also chipper head drive motor control relay 414 is provided with an interlock contact 414D, functioning to interlock the chipper head start button 410 after manual release thereof.

Alternator 415 is driven from constant speed motor 412 through variable speed magnetic clutch 417 which clutch 417 constitutes the basic control component of the system in effecting correlation of the speed of chipper head drive motor 416 and the speed of planer feed motor 400, under control of an adjustable r.p.m. control 418.

It will be understood that variable speed magnetic clutches, such as diagrammatically presented at 417, are known to the electrical control art, such as the clutch disclosed in U.S. Patent 2,287,953, and that adjustable r.p.m. control means 418 therefore are also known per se to the electrical control art, such as the control circuitry disclosed in U.S. Patent 2,277,284.

Basically, the control inputs to adjustable r.p.m. control 418 are control power energization from lines X and Y, as indicated at 420 and 421, time delay energization of the adjustable r.p.m. control from a mechanical control input from time delay relay 405, as indicated at 422 (often time delay relay 405 is physically built into adjustable r.p.m. control 418), and an external control signal indicated at 423 derived from an external generator 424 in turn mechanically driven by planer feed motor 400 through belts and pulleys 425.

The adjustable r.p.m. control 418 in turn generates from these inputs an output control signal 427 selectively varying the speed of variable speed magnetic clutch 417.

Upon start-up, and when the operator first starts the chipper head through actuation of start button 410, constant speed motor 412 when energized in turn drives the input side of variable speed clutch 417 at a constant speed mechanically through belts and pulleys indicated at 426. Since there is then no excitation from the external generator 424 driven by the planer feed drive motor 400, the adjustable r.p.m. control 418 automatically, through its internal control components produces a 1:1 ratio through the variable speed clutch 417, bringing A.C. alternator 415 to speed in synchronism with constant speed motor 412. Since the contacts 414A–C of chipper head drive motor control relay 414 are closed, chipper head motor 416 accelerates to full speed in synchronism with the alternator 415 and the chipper head drive motor 416 remains at full speed until the variable speed planer feed drive motor 400 is started.

When the operator starts the planer feed drive motor 400 by actuation of start button 402', rotation of the planer speed drive motor 400 will in turn drive external generator 424, generating control signal 423 indicating to adjustable r.p.m. control 418 the amount of slippage in the variable speed clutch 417 desired to correlate the chipper speed with the selected lumber feed speed. The output of clutch 417 drives the A.C. alternator 415 at the indicated speed and the chipper head drive motor rotational speed thus established and maintained produces the desired uniform chip fibre length.

Having started the planer feed drive motor and the feeding of lumber into the machine, and having measured the excitation of the feed works by means of external generator 424, adjustable r.p.m. control 418 matches and maintains the proper chipper head rotational speed through regulation of the slip factor occurring in the variable speed magnetic clutch 417. There is thus exerted a close control of the r.p.m. chipper head drive motor speed through the reduced r.p.m. of the A.C. alternator 415.

Accordingly, it will be readily understood that within the functional capabilities of the electrical control system presented in FIGS. 21–24, the degree of control exerted by the adjustable r.p.m. control 418 on variable speed magnetic clutch 417 can be selectively preset so that any given desired chip length can be formed by the chipper head or chipper heads.

The specific function of time delay relay 405 as it relates to the operation of a chipper head unit will now be discussed. Having previously noted that a chipper head is driven at its highest rated r.p.m. when the planer feed works is not operated, it will also be observed that the highest rotational speed of a chipper head will also occur when the feed works is stopped after the chipper head and planer have been running, and the basic purpose of time delay relay 405 is to allow the feed works to come up to speed before the chipper head rotational speed is reduced to bring it into coordinated r.p.m. with the feeding speed of the planer. For purposes of a typical installation, a time delay of 6 seconds has been more or less arbitrarily selected and it is to be expected that time delays from 4–10 or possibly even 15 seconds are entirely appropriate under certain circumstances consistent with this consideration. Time delay relay 405 thus prevents the chipper head from coming down to its correlated speed before the feed works of the machine is at pre-selected feed speed. It is common practice in the industry to jog the feed works in short motions while the planer and chipper heads are being set up for thickness and/or width of cut, and simultaneous energization of the adjustable r.p.m. control 418 with every jog would impose considerable loading on the electrical components. The time delay provided by the time delay relay 405 between starting up the machine motors and coordinated control of the chipper head rotational speed effectively overcomes any difficulty which would be produced by this industry practice.

While the chipper head arranged across the width dimension of the lumber has been referred to as a top chipper unit, it will be obvious that such can be placed as well to blank the bottom surface and that a given side chipper unit can be placed at either side of the lumber stock. Further, while the staggered arrangement of chipper head forming discs has been described and illustrated as simply helical, it will be understood that a compound helix pattern, sloped outwardly and rearwardly from the direction of cutter head rotation could well be adopted in a given cutter head, particularly of wide design, and that the cutter head discs can be formed with sloping throat or gullet surfaces to give an essentially smooth chip discharge surface, consistent with the rapid withdrawal of formed chips, as disclosed.

Also, while a cutter head diameter of 11 inches has been disclosed as suitable, it will be readily understood that cutter head diameter can be varied considerably without change in the basic manner of operation and correlation of chipper rotational speed with lumber feed speed.

While the nature and high degree of uniformity characterizing the chips formed by the present invention and discovery render such particularly advantageous for pulping purposes, it will be evident to those skilled in the art that such chips can also be used in the manufacture of hardboard, chipboard, flakeboard or any other similar product incorporating comminuted wood of more or less uniform large dimension, with or without pre-pulping.

While various typical forms of equipments and control components and circuitry have been disclosed as typically embodying the principles and features of the present invention and discovery, it will be readily apparent that other various forms and manner of operation thereof can be adopted consistent with the basic features and scope of the invention.

What is claimed is:

1. In combination with a conventional high speed planer having a feed drive motor and a feed motor control, mechanism comprising a chipper unit including a chipper head having 12–20 knives arranged to climb mill a part only of one unfinished dimension of the rough lumber prior to planing thereof and form a chip entirely and completely cut out of the lumber, motor means rotatively driving said chipper head, and a control system maintaining the rotational speed of the chipper head of 1000 r.p.m. or less correlated to the lumber feed speed of 600–800 feet per minute, said control system comprising speed governing means having a constant speed input and a variable speed output driving the drive motor for said chipper head.

2. In combination with a conventional high speed planer having a feed drive motor and a feed motor control, mechanism comprising a chipper unit disposed in the line of feed of said planer and having a chipper head arranged to climb mill a part only of one unfinished dimension of the rough lumber prior to planing thereof and means rotatively driving said chipper head in cutting entirely and completely a chip, said combination further comprising a control system for maintaining the rotational speed of the chipper head in direct proportion to the lumber feed speed, said control system comprising variable speed clutch means having a constant speed input and a variable speed output driving the drive motor for said chipper head, said variable speed clutch means being responsive to speed control means in turn responsive to lumber feed speed in adapting the speed to different species of wood.

3. In combination with a conventional high speed planer having a feed drive motor and a feed motor control, mechanism comprising a chipper unit disposed in the line of feed of said planer and having a chipper head arranged to climb mill a part only of one unfinished dimension of the rough lumber prior to planing thereof and means rotatively driving said chipper head in cutting entirely and completely a chip, said combination further comprising a control system having a constant speed power source for said chipper head driving means, a variable speed power source for driving the feed works of the planer, speed variable means driven by said constant speed power source and in turn driving said chipper head drive means, lumber speed sensing means, and means controlling said speed variable means responsive to said lumber feed speed sensing means to maintain the chipper head rotational speed proportional to the lumber feed speed in adapting to different species of wood.

4. In combination according to claim 3, having an A.C. motor as the constant speed power source for driving said chipper head, an A.C. motor as the variable speed power source for driving the feed works of the planer, a magnetic clutch as the speed varying means driven by the first said A.C. motor and in turn driving the chipper head drive means, an external generator as the lumber speed sensing means, and adjustable speed control means controlling said speed varying means responsive to said lumber feed speed sensing means to maintain the chipper head rotational speed proportional to the lumber feed.

5. The method of finishing lumber at high speed and providing as a valuable by-product relatively large chips formed from one excess dimension of the rough lumber, said chips having a high degree of uniformity as to fibre length, said method comprising feeding the rough lumber past the chipper head while rotating said chipper head to climb mill at least a substantial portion of said excess dimension in the direction of the grain and form a chip entirely and completely cut out of the excess dimension and at a rate to produce chips having a fibre length of at least about ⅜ inch, and removing by air suction the chips without breakage thereof, said chips being relatively short and thick.

6. The method of finishing lumber at high speed and providing as a valuable by-product large chips formed from one excess dimension of the rough lumber, said chips having a high degree of uniformity as to fiber length, said method comprising feeding the rough lumber past a chipper head while rotating said chipper head to climb mill at least a substantial portion of said excess dimension out of the excess dimension—and form a chip entirely and completely cut out of the excess dimension at a rate to produce chips having a fiber length of at least about ⅜ inch, and controlling the speed of feed of the lumber past the chipper head and the speed of rotation of the chipper head in a manner producing chips of substantially uniform length irrespective of variations in lumber feed speed, said chips being of relatively short length and relatively thick.

7. A method according to claim 6, comprising maintaining the chipper head rotational speed to produce chips having a substantially uniform fiber length in the range of from about ⅜ inch to about one inch.

8. The method according to claim 6, comprising forming chips from a portion of the thickness dimension of the rough lumber.

9. The method according to claim 6, comprising forming chips from a portion of the width dimension of the rough lumber.

10. The method according to claim 6, comprising forming chips from both an edge surface and a side surface of the rough lumber.

11. The method of finishing lumber at high speed and providing as a valuable by-product large chips formed from an excess dimension of the rough lumber, said chips having uniformity as to fibre length and being of a nature suitable for use as pulping stock or the like, said method comprising feeding the rough lumber past the chipper head while rotating said chipper head to climb mill at least a substantial portion of said excess dimension and form a chip entirely and completely out of the excess dimension at a rate to produce chips having a fibre length of at least about 3/8 inch, thereafter feeding the lumber through a high speed planer mechanism to finish the same, selectively controlling the rate of feed of the lumber past the chipper head and through the planer mechanism to obtain optimum finishing of the lumber according to the nature and condition thereof, and automatically controlling the speed of rotation of the chipper head in a manner correlating the chipper head rotational speed with the lumber feed speed to produce chips of substantially uniform length irrespective of variation in lumber feed speed, said chips being of relatively short length and relatively thick.

12. A method according to claim 11, comprising maintaining the chipper head rotational speed to produce chips having a substantially uniform fibre length in the range of from about 3/8 inch to about 1 inch.

13. The method according to claim 12, comprising maintaining the chipper head rotational speed to produce chips having a substantially uniform fibre length in the range of from about 5/8 inch to one inch.

14. In the method of forming a chip cut from lumber in process of finishing the same, said chip being of a given profile for pulp digestion, and being three-sided chips having substantially fibers of uniform length by climb-milling a part only of an unfinished dimension of a rough-sawn lumber from one surface portion of said rough lumber by a chipper head formed of stacked discs having cutter knives, each knife having an easy smooth curved throat of a depth which cuts the chip with body of a magnitude resistant to breaking and bruising, said chip being cut entirely and completely out of the unfinished dimension of the lumber, said rate of feed being 600 to 800 feet per minute with cutter head speed of less than 1000 r.p.m. and with knives numbering 12–20 per disc.

15. The method of forming a chip of wood of a given profile for pulp digestion, feeding the rough lumber to the chipper head, which cuts by climb-milling said lumber, at a predetermined rate of feed; and automatically adjusting the cutter head r.p.m. to the lumber feed speed so that a fixed proportional relationship exists between the two which will produce a chip entirely and completely cut from the lumber of constant profile regardless of the predetermined selected feed rate, said rate of feed being 600 to 800 feet per minute with cutter head speed of less than 1000 r.p.m. and with knives numbering 12–20.

16. The method of forming a chip of wood of a given profile for pulp digestion, comprising cutting a three-sided chip of a predetermined profile having fibers of substantially uniform length by climb-milling a part only of an unfinished dimension of a rough-sawn lumber from one surface portion of said rough lumber by a chipper head which entirely and completely cuts a chip, said head being formed of stacked discs having cutter knives, each knife having an easy smooth curved throat of a depth which cuts the chip with body of a magnitude resistant to breaking and bruising; feeding the rough lumber to the chipper head, which cuts by climb-milling said lumber, at a predetermined rate of feed; automatically adjusting the cutter head r.p.m. to the lumber feed speed so that a fixed proportional relationship exists between the two which will produce a chip of desired constant profile regardless of the predetermined selected feed rate; and maintaining the peripheral speed of the knife always proportional to the feed speed of the lumber, regardless of the feed rate selected, in order to maintain the desired profile at the predetermined feed rate, said rate of feed being 600 to 800 feet per minute with cutter head speed of less than 1000 r.p.m. and with knives numbering 12–20 per disc.

References Cited in the file of this patent

UNITED STATES PATENTS

| | | |
|---|---|---|
| Re. 7,143 | Coogan | May 30, 1876 |
| 475,881 | Merrill | May 31, 1892 |
| 483,970 | Thomas | Oct. 4, 1892 |
| 497,979 | Hayes | May 23, 1893 |
| 1,075,907 | Dunton | Oct. 14, 1913 |
| 1,282,285 | Plank | Oct. 22, 1918 |
| 1,449,862 | Krohn | Mar. 27, 1923 |
| 1,670,360 | Johnson | May 22, 1928 |
| 1,735,594 | Anderson | Nov. 12, 1929 |
| 1,794,859 | Maass | Mar. 3, 1931 |
| 1,938,108 | Morris | Dec. 5, 1933 |
| 2,102,186 | Nicholson et al. | Dec. 14, 1937 |
| 2,204,439 | Nicholson et al. | June 11, 1940 |
| 2,276,240 | Nicholson et al. | Mar. 10, 1942 |
| 2,277,284 | Winter | Mar. 24, 1942 |
| 2,287,953 | Winter | June 30, 1942 |
| 2,401,164 | King et al. | May 28, 1946 |
| 2,571,861 | Gegumis | Oct. 16, 1951 |
| 2,655,189 | Clark | Oct. 13, 1953 |
| 2,689,092 | Clark et al. | Sept. 14, 1954 |
| 2,725,084 | Carlson | Nov. 29, 1955 |
| 2,738,813 | Pritchard | Mar. 20, 1956 |
| 2,751,947 | Wyss | June 26, 1956 |
| 2,771,921 | Ambelang | Nov. 27, 1956 |
| 2,811,183 | Mottet | Oct. 29, 1957 |
| 2,819,744 | Chuet et al. | Jan. 14, 1958 |
| 2,840,127 | Stokes et al. | June 24, 1958 |
| 2,884,031 | Standal | Apr. 28, 1959 |
| 2,889,859 | Johnson | June 9, 1959 |
| 2,899,992 | Key | Aug. 18, 1959 |